United States Patent Office 3,705,169
Patented Dec. 5, 1972

3,705,169
HYDROXYPHENYL-2-PIPERIDINYLCARBINOLS
Carl Kaiser, Haddon Heights, N.J., and Stephen T. Ross, Berwyn, Pa., assignors to Smith Kline & French Laboratories, Philadelphia, Pa.
No Drawing. Continuation-in-part of abandoned application Ser. No. 864,865, Oct. 8, 1969. This application Nov. 5, 1970, Ser. No. 87,340
Int. Cl. C07d 29/16
U.S. Cl. 260—293.84    8 Claims

ABSTRACT OF THE DISCLOSURE

Hydroxyphenyl-2-piperidinylcarbinols prepared by the condensation of an appropriately substituted ether derivative of a hydroxybenzaldehyde with 2-pyridyl lithium followed by removal of the ether group(s) and reduction have $\beta$-adrenergic stimulant activity. Erythro and threo diastereoisomers may be conveniently separated.

This application is a continuation-in-part of application Ser. No. 864,865 filed Oct. 8, 1969, now abandoned.

This invention relates to novel hydroxyphenyl-2-piperidinylcarbinols which have useful pharmacodynamic activity. More specifically the compounds of this invention have utility as $\beta$-adrenergic stimulants with relatively greater activity on respiratory smooth muscle than on cardiac muscle. Therefore these compounds have direct bronchodilator action with minimal cardiac stimulation as demonstrated in standard pharmacological test procedures.

Two in vitro test systems used for determining selective $\beta$-stimulant activity are: (1) effect on spontaneous tone of guinea pig tracheal chain preparations as a measure of $\beta$-stimulant (direct relaxant) effect on airway smooth muscle, and (2) effect on rate of spontaneously beating right atria of the guinea pig as a measure of $\beta$-stimulant effect on cardiac muscle. The compounds of this invention have selective bronchodilating properties since they are active in (1) above at a dose lower than is required in (2) above resulting in a positive separation ratio.

The compounds of this invention are represented by the following general structural formula:

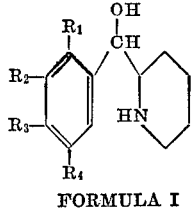

FORMULA I in which:

$R_1$ represents hydrogen, methyl or chlorine; and
$R_2$, $R_3$ and $R_4$ each represent hydrogen or hydroxy, at least one of which is hydroxy.

Advantageous compounds of Formula I are those wherein $R_1$ is hydrogen, $R_2$ is hydroxy and at least one of $R_3$ and $R_4$ is hydroxy.

The compounds of this invention may be used in the form of a pharmaceutically acceptable acid addition salt having the utility of the free base. Such salts, prepared by methods well known to the art, are formed with both inorganic or organic acids, for example: maleic, fumaric, benzoic, ascorbic, pamoic, succinic, bismethylenesalicyclic, methanesulfonic, ethanedisulfonic, acetic, oxalic, propionic, tartaric, salicyclic, citric, gluconic, lactric, malic, mandelic, cinnamic, citraconic, aspartic, stearic, palmitic, itaconic, glycolic, p-aminobenzoic, glutamic, benzenesulfonic, hydrochloric, hydrobromic, sulfuric, cyclohexyl sulfamic, phosphoric and nitric acids.

Further the compounds of this invention may be present as diastereoisomers and are designated as erythro- and threo-isomers which may be resolved as $d$, $l$ optical isomers. Unless otherwise specified in the description and accompanying claims, it is intended to include all isomers, whether separated or mixtures thereof.

A preferred compound of this invention is erythro-3,4-dihydroxyphenyl-2-piperidinylcarbinol which relaxes the spontaneous tone of guinea pig tracheal ring preparation at an $ED_{50}$ of 0.0036 mcg./ml. while increasing the rate of contraction of guiena pig right atria at an $ED_{25}$ of 0.035 mcg./ml. These activities give an absolute separation ratio of 10 which is a twenty-fold improvement when compared to the corresponding activity of $d,l$ isoprotenenol (absolute separation ratio=0.5) in similar in vitro preparations.

The compounds of this invention are prepared from a sequence of reactions illustrated by the following preparation of 3,4-dihydroxyphenyl-2-piperidinylcarbinol:

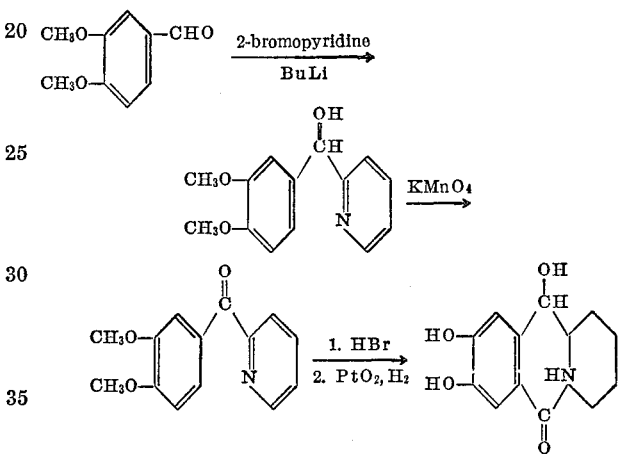

Thus, as shown above, a lower alkyl ether derivative of an appropriately substituted hpdroxybenzaldehyde is condensed with a 2-halopyridine, preferably bromo, in the presence of an organometal derivative, preferably butyl lithium, and in an organic nonreactive solvent such as tetrahydrofuran or ether to give a substituted phenyl 2-pyridylcarbinol. The latter is oxidized for example with potassium permanganate to the corresponding ketone. The ketone is demethylated with 48% hydrobromic acid and then reduced with for example platinum oxide and hydrogen to give the hydroxyphenyl-2-piperidinylcarbinol. This results in a mixture of erythro/threo isomers present in about a 4:1 ratio. The individual isomers are obtained by fractional crystallization of the product, preferably as an acid addition salt.

Alternatively a benzyl ether derivative of an appropriately substituted hydroxybenzaldehyde is condensed as above with a 2-halopyridine to give a substituted phenyl-2-pyridylcarbinol. The latter is reduced with platinum oxide and hydrogen to give the corresponding 2-piperidinylcarbinol and then debenzylated with palladium-on-carbon and hydrogen to yield the hydroxyphenyl-2-piperidinylcarbinol.

A further modification of the preparation of the compounds of this invention is the condensation of the Grignard reagent derived from a methyl ether derivative of an appropriately substituted hydroxy halobenzene, preferably bromobenzene, with 2-cyanopyridine. The resulting ketone is demethylated and reduced as described above to give the product.

If desired the diastereoisomers of the compounds of Formula I may be separated, for example, by the following procedure. The benzyl ether derivative of an appropriately substituted hydroxybenzaldehyde is treated as described above with 2-pyridyl lithium and the resulting pyridylcarbinol as the hydrochloride is reduced catalytically to give an isomeric mixture of benzyloxyphenyl-2-piperidinylcarbinol hydrochlorides from which a single hydrochloride is isolated by recrystallization. The latter is converted to its diastereoisomer by thionyl chloride conversion to the chloride (retention) followed by hydrolysis of the chloride with aqueous silver nitrate (inversion). Stereochemistry of the diastereoisomers is established by examination of the NMR spectra of the corresponding benzyloxyphenyl-2-piperidinylcarbinol cyclic carbamates derived from treatment with phosgene. Debenzylation of the separated diastereoisomers as described above affords the erythro and threo products of Formula I.

The compounds of this invention may be administered orally or parenterally in conventional dosage unit forms such as tablets, capsules, injectables or the like, by incorporating the appropriate dose of a compound of Formula I, with carriers according to accepted pharmaceutical practices. Preferably a compound or an acid addition salt thereof is administered orally to an animal organism in a tablet or capsule comprising an amount sufficient to produce β-adrenergic stimulant activity. Each dosage unit will contain the active medicament in an amount of about 25 mg. to about 50 mg. Advantageously equal doses will be administered 3 to 4 times daily with the daily dosage regimen being about 75 mg. to about 200 mg.

The pharmaceutical carrier employed may be, for example, either a solid or liquid. Exemplary of solid carriers are lactose, terra alba, sucrose, talc, gelatin, agar, pectin, acacia, magnesium stearate, stearic acid and the like. Exemplary of liquid carriers are syrup, peanut oil, olive oil, water and the like. Similarly the carrier or diluent can include any time delay material well known to the art, such as glyceryl monostearate or glyceryl distearate alone or with a wax.

A wide variety of pharmaceutical forms can be employed. Thus, if a solid carrier is used the preparation can be tableted, placed in a hard gelatin capsule in powder or pellet form, or in the form of a troche or lozenge. The amount of solid carrier will vary widely but preferably will be about 25 mg. to about 1 g. If a liquid carrier is used, the preparation will be in the form of a syrup, emulsion, soft gelatin capsule, sterile injectable liquid such as an ampule, or an aqueous or nonaqueous liquid suspension. Of particular applicability for intranasal administration is an aerosol dispensing system wherein the active medicament is incorporated with Freon or other inert propellant in an aerosol container. Such an aerosol system will deliver a metered dose of about 250 mcg. to about 500 mcg., administered once or twice at a time as needed. Also useful for this purpose is a liquid formulation in a plastic squeeze bottle.

The foregoing is a general description of how to prepare the compounds of this invention. The following examples illustrate the preparation of specific compounds having β-adrenergic stimulant activity. However this should not be construed as a limitation of the invention since appropriate variations in the starting materials will produce other products set forth hereinabove.

EXAMPLE 1

To a stirred suspension of 5.0 g. (0.21 g. atom) of magnesium turnings in 15 ml. of tetrahydrofuran under nitrogen is added 43.4 g. of 4-bromoveratrole (0.2 m.) to maintain constant reflux. An additional 40 ml. of solvent is added and the Grignard reagent thus prepared is heated on a steam bath for one hour. This solution is then added dropwise to a solution of 20.8 g. (0.2 m.) of 2-cyanopyridine in 300 ml. of ether. The mixture is stirred overnight at room temperature, decomposed by addition of 250 ml. of 10% hydrochloric acid and the separated aqueous layer is made alkaline with 40% sodium hydroxide solution. This mixture is extracted with methylene chloride and the dried extract concentrated. The residue is distilled and the fraction at 190–235° C./12 mm. is crystallized to give 3,4-dimethoxyphenyl-2-pyridyl ketone, M.P. 93–94° C.

A solution of 0.5 g. of the above ketone in 15 ml. of 48% hydrobromic acid is refluxed for one and one-half hours and then concentrated in vacuo. The residue is dissolved in ethanol, toluene is added, the solution concentrated and the residue stripped with toluene to yield 3,4-dihydroxyphenyl-2-pyridyl ketone hydrobromide, M.P. 246–247° C. (decomp.).

A mixture of 0.5 g. of platinum oxide and a solution of 2.0 g. (0.0067 m.) of 3,4-dihydroxyphenyl-2-pyridyl ketone hydrobromide in 20 ml. of water and 80 ml. of ethanol is hydrogenated on the Parr apparatus using an initial hydrogen pressure of 50 p.s.i. at room temperature. The reaction mixture is filtered, the filtrate concentrated in vacuo and the residue triturated with acetone to give erythro-3,4-dihydroxy - phenyl-2-piperidinylcarbinol hydrobromide, M.P. 210–211° C. (decomp.).

Treatment of the above hydrobromide with aqueous sodium bicarbonate followed by extraction with ethyl acetate yields the free base of the carbinol M.P. 203–204° C. which may be reacted with other acids as described hereinabove to give other acid addition salts.

EXAMPLE 2

A stirred solution of 187.5 ml. of 1.6 M solution of butyl lithium in hexane is cooled to −40° C. under nitrogen and 39.5 g. (0.25 m.) of 2-bromopyridine in 100 ml. of ether is added dropwise. The mixture is stirred 15 minutes at −40° C. and a solution of 41.5 g. (0.25 m.) of 3,4-dimethoxybenzaldehyde in 200 ml. of ether is added. After stirring at −15° C. for 45 minutes, the mixture is poured into 500 g. ice/100 ml. concentrated hydrochloric acid. The separated aqueous layer is made alkaline with concentrated ammonium hydroxide, extracted with methylene chloride and the dried extract concentrated. The residual oil is crystallized to give 3,4-dimethoxyphenyl-2-pyridylcarbinol, M.P. 92–94° C.

A stirred suspension of 12.3 g. (0.05 m.) of the above carbinol in 150 ml. of water is heated to 70° C. and 11.9 g. (0.075 m.) of potassium permanganate is added in portions. The mixture is stirred and heated on a steam bath for 40 minutes, cooled to 30° C. and diluted with 150 ml. of ethyl acetate. This mixture is filtered, and the organic extract is dried and concentrated to give 3,4-dimethoxyphenyl-2-pyridyl ketone, M.P. 93–94° C.

Treatment of the above ketone with hydrobromic acid followed by hydrogenation of the 3,4-dihydroxyphenyl ketone as outlined in Example 1 yields an isomeric mixture from which the identical product erythro-3,4-dihydroxyphenyl-2-piperidinylcarbinol hydrobromide is isolated.

EXAMPLE 3

A solution of 1 mole of n-butyl lithium in hexane is cooled under nitrogen to −40° C. and a solution of 131.6 g. (0.823 m.) of 2-bromopyridine in 340 ml. of dry ether is added dropwise. The mixture is stirred at this temperature for 15 minutes and a solution of 112 g. (0.823 m.) of p-anisaldehyde in 760 ml. of dry ether is added dropwise. This mixture si stirred at −15° C. for one hour and then poured into 1700 ml. of ice/water containing 333 ml. of concentrated hydrochloric acid. The separated acid layer is made basic, extracted with methylene chloride and the dried extract evaporated in vacuo to give 4-methoxyphenyl-2-pyridylcarbinol, M.P. 129–131° C.

A mixture of 50 g. (0.233 m.) of the above-prepared benzyl alcohol in 700 ml. of water is stirred at 70° C. while 55.4 g. (0.349 m.) of potassium permanganate is added in portions. The mixture is stirred on the steam bath for 40 minutes, cooled and diluted with 700 ml. of ethyl acetate. This mixture is filtered and the separated ethyl acetate solution is water washed, dried and evaporated in vacuo to give 4-methoxyphenyl-2-pyridyl ketone, M.P. 95.5–97° C.; hydrochloride M.P. 177–179° C.

A solution of 5.0 g. (0.0234 m.) of the above-prepared ketone in 50 ml. of 48% hydrobromic acid is stirred and refluxed for one and one-half hours, then evaporated in vacuo. The residue is dissolved in methanol, diluted with toluene and evaporated again. This residue after trituration with toluene and subsequent evaporation yields 4-hydroxyphenyl-2-pyridyl ketone hydrobromide, M.P. 230–233.5° C.

A mixture of 5.0 g. (0.0178 m.) of 4-hydroxyphenyl-2-pyridyl ketone hydrobromide and 1.0 g. of platinum oxide in 200 ml. of ethanol is hydrogenated under 50 lbs. of hydrogen at room temperature for 30 minutes. The reaction mixture is filtered and the filtrate evaporated in vacuo. The residue is dissolved in ethanol, filtered and diluted with ether to give 4-hydroxyphenyl-2-piperidinylcarbinol hydrobromide, M.P. 203–204° C. (decomp.).

EXAMPLE 4

Condensation of 20.8 g. (0.125 m.) of 3,5-dimethoxybenzaldehyde with pyridyl lithium (from 19.8 g. of 2-bromopyridine and 94 ml. of 1.6 M of butyl lithium in hexane) is carried out as in Example 2 to give 3,5-dimethoxyphenyl-2-pyridylcarbinol. Oxidation of the latter, 5 g. (0.02 m.), with potassium permanganate gives 3,5-dimethoxyphenyl-2-pyridyl ketone, M.P. 62.65° C. A solution of the ketone (7.5 g.) and 65 ml. of 48% hydrobromic acid is refluxed for two hours, concentrated in vacuo and the residue crystallized to yield 3,5-dihydroxyphenyl-2-pyridyl ketone hydrobromide, M.P. 212° C. (decomp.). The latter (3.8 g.) in 100 ml. of methanol is hydrogenated in a Parr apparatus at 25° C. and an initial hydrogen pressure of 60 p.s.i. in the presence of 0.9 g. of platinum oxide. The reaction mixture is filtered and the filtrate concentrated to give 3,5-dihydroxyphenyl-2-piperidinylcarbinol hydrobromide, M.P. 217° C. (decom.).

EXAMPLE 5

To a stirred solution of 25 g. (0.134 m.) of 2-chloroisovanillin in 80 ml. of methylene chloride at 0° C. is added dropwise 19 ml. (0.2 m.) of boron tribromide and the mixture is stirred at 25° C. for three hours. Methanol (100 ml.) is added and the solution is concentrated to give 2-chloroprotocatechualdehyde, M.P. 193–195° C.

The above catechualdehyde (15.2 g.), 24 g. of potassium carbonate and 1.0 g. of sodium iodide in 300 ml. of ethanol is treated, by dropwise addition, with a solution of 22 g. of benzyl chloride in 70 ml. of ethanol. The mixture is stirred and refluxed for 17 hours, concentrated and diluted with water to give 2-chloro-3,4-dibenzyloxybenzaldehyde.

Condensation of 6.65 g. (0.0189 m.) of the above aldehyde with pyridyl lithium (from 3.0 g. of 2-bromopyridine and 16.8 ml. of 1.6 M butyl lithium in hexane) yields 2-chloro-3,4-dibenzyloxyphenyl - 2 - pyridylcarbinol; hydrochloride hydrate M.P. 100° C. (dec.).

A mixture of 2.85 g. (0.0061 m.) of the above hydrochloride, 0.7 g. of platinum oxide and 100 ml. of methanol is hydrogenated at 25° C. and on initial hydrogen pressure of 60 p.s.i. on a Parr apparatus. After 45 minutes the reaction mixture is filtered, the filtrate concentrated and the residue crystallized to give 2-chloro-3,4-dibenzyloxyphenyl-2-piperidinylcarbinol hydrochloride, M.P. 212–213° C.

The above dibenzyloxy derivative (2.3 g.) with 0.6 g. of 10% palladium-on-carbon in 100 ml. of methanol is hydrogenated on a Parr apparatus at 25° C. and 60 p.s.i. initial hydrogen pressure. After 30 minutes the reaction mixture is filtered, the filtrate concentrated and the residue triturated with acetone to give 2-chloro-3,4-dihydroxyphenyl-2-piperidinylcarbinol hydrochloride, M.P. 209° C. (decomp.).

EXAMPLE 6

To a stirred 1.6 M solution of butyl lithium in 89 ml. of hexane under nitrogen at —40° C. is added 15.8 g. (0.1 m.) of 2-bromopyridine in 40 ml. of ether. After stirring for 15 minutes 21.2 g. of 3-benzyloxybenzaldehyde in 100 ml. of ether is added and the mixture is stirred for 45 minutes at —15° C. The reaction mixture is poured onto 250 g. of ice and the precipitated oil is extracted into ether. The ether extract is dried, concentrated and the residual oil converted to a hydrochloride to give 3-benzyloxyphenyl-2-pyridylcarbinol hydrochloride, M.P. 179–180° C.

A mixture of 5.6 g. (0.0193 m.) of the above hydrochloride, 1.25 g. of platinum oxide and 200 ml. of methanol is hydrogenated at 25° C. in a Parr apparatus using an initial hydrogen pressure of 60 p.s.i. The reaction mixture is filtered and the filtrate concentrated to give erythro-3-benzyloxyphenyl-2-piperidinylcarbinol hydrochloride, M.P. 150–152° C. (decomp.).

A mixture of 2.4 g. of the above benzyloxypiperidinylcarbinol, 1.0 g. of 10% palladium-on-carbon and 100 ml. of methanol is similarly reduced to yield erythro-3-hydroxyphenyl-2-piperidinylcarbinol hydrochloride hemihydrate as an amorphous solid.

EXAMPLE 7

To a stirred solution of 1.6 M butyl lithium in hexane (45 ml.) under nitrogen at —40° C. is added a solution of 7.9 g. (0.05 m.) of 2-bromopyridine in 25 ml. of tetrahydrofuran and the mixture is stirred for 15 minutes. A solution of 15.9 g. (0.05 m.) of 3,4-dibenzyloxybenzaldehyde in 100 ml. of tetrahydrofuran is added dropwise over 20 minutes. This mixture is stirred at —40° C. for 20 minutes and then allowed to come to 20° C. during one hour. The reaction mixture is poured onto 300 ml. of ice and the precipitated oil is extracted into ether. The dried ether extract is concentrated to give 3,4-dibenzyloxyphenyl-2-pyridylcarbinol.

A solution of 6.55 g. (0.0165 m.) of the above carbinol in 200 ml. of methanol is carefully adjusted to pH 4 with hydrogen chloride, 1.2 g. of platinum oxide is added and the mixture is hydrogenated at 25° C. on a Parr apparatus with an initial hydrogen pressure of 60 p.s.i. After one hour the reaction mixture is filtered and the filtrate concentrated in vacuo. The residue is crystallized to give a mixture of erythro- and threo-3,4-dibenzyloxyphenyl-2-piperidinylcarbinol hydrochloride, M.P. 169–176° C. Several recrystallizations from ethanol-ether affords the erythro-isomer, M.P. 189–194° C.

A solution of 5.0 g. of erythro-3,4-dibenzyloxyphenyl-2-piperidinylcarbinol hydrochloride and 1.0 ml. of thionyl chloride in 26.5 ml. of chloroform is refluxed for one hour and then concentrated in vacuo. The residue is dissolved in 100 ml. of 3 N siliver nitrate solution and the mixture stirred and refluxed for one hour. The reaction mixture is filtered and the filtrate is made alkaline with 2 N sodium hydroxide solution. The precipitated base is extracted into chloroform and the dried extract concentrated. The residual oil is taken into ethanol and treated with hydrogen chloride to give threo-3,4-dibenzyloxyphenyl-2-piperidinylcarbinol hydrochloride, M.P. 152–153° C.

A mixture of 2.0 g. of the above threo compound, 0.5 g. of 10% palladium-on-carbon and 100 ml. of methanol is hydrogenated at 25° C. on a Parr apparatus using an initial hydrogen pressure of 60 p.s.i. After 30 minutes the reaction mixture is filtered and the filtrate is concentrated to yield threo-3,4-dihydroxyphenyl - 2 - piperidinylcarbinol hydrochloride, M.P. 210° C. (decomp.).

EXAMPLE 8

Following the procedure of Example 2, a solution of 8.27 g. (0.0523 m.) of 2-bromopyridine in 45 ml. of ether is added dropwise to a stirred solution of 40 ml. of 1.6 M butyl lithium in hexane cooled to —40° C. A solution of 9.42 g. (0.0523 m.) of 2-methyl-3,4-dimethoxybenzaldehyde in 45 ml. of ether is added. After stirring at —15° C. for 45 minutes, the reaction mixture is poured into ice/concentrated hydrochloric acid to yield after similar workup 3,4-dimethoxy-2-methylphenyl - 2 - pyridylcarbinol, M.P. 106–114° C. Oxidation of the latter, 7.3 g. (0.0282 m.), with 1.5 equivalents of potassium permanganate in 85 ml. of water gives 3,4-dimethoxy-2-methylphenyl-2-pyridyl ketone, M.P. 93–96° C.

A solution of 5 g. (0.0194 m.) of the ketone in 50 ml. of 48% hydrobromic acid is refluxed with stirring for one and one-half hours, evaporated in vacuo and the residue crystallized to give 4-hydroxy-3-methoxy - 2 - methylphenyl-2-pyridyl ketone hydrobromide, M.P. 218–220° C. The latter (2.67 g.) is refluxed in 100 ml. of 48% hydrobromic acid for two hours and similarly worked up to furnish the 3,4-dihydroxy - 2 - methylphenyl - 2 - pyridyl ketone hydrobromide, M.P. 269–272° C. (dec.).

To a solution of 2.2 g. (0.0071 m.) of 3,4-dihydroxy-2-methylphenyl - 2 - pyridyl ketone hydrobromide in 20 ml. of water and 80 ml. of methanol is added 0.3 g. of platinum oxide. The mixture is hydrogenated on the Parr apparatus using an initial hydrogen pressure of 60 p.s.i. at 25° C. Hydrogen uptake is complete in about 15 minutes and the reaction mixture is filtered. The filtrate is treated with sulfur dioxide, concentrated in vacuo and the residue crystallized to yield 3,4-dihydroxy - 2 - methylphenyl-2-piperidinylcarbinol hydrobromide, M.P. 193–194° C. (dec.). The hydrobromide (0.8 g.) in about 5 ml. of water is neutralized with potassium carbonate. The free base thus obtained is suspended in methanol and ethereal hydrogen chloride is added to give the corresponding 3,4-dihydroxy-2-methylphenyl - 2 - piperidinylcarbinol hydrochloride, M.P. 142–144° C. (dec.).

What is claimed is:
1. A chemical compound of the formula:

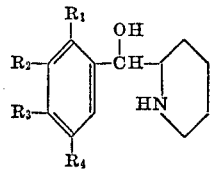

or a pharmaceutically acceptable acid addition salt of said compound, wherein:

$R_1$ is hydrogen, methyl or chlorine;
$R_2$ is hydroxy; and
$R_3$ and $R_4$ are each hydrogen or hydroxy, with at least one being hydroxy.

2. A chemical compound according to claim 1 in which $R_1$ is hydrogen.

3. A chemical compound according to claim 2 in which $R_3$ is hydroxy, being the compound 3,4-dihydroxyphenyl-2-piperidinylcarbinol.

4. The erythro diastereoisomer of the compound according to claim 3.

5. The threo diastereoisomer of the compound according to claim 3.

6. A chemical compound according to claim 2 in which $R_4$ is hydroxy, being the compound 3,5-dihydroxyphenyl-2-piperidinylcarbinol.

7. A chemical compound according to claim 1 in which $R_1$ is chlorine, $R_2$ and $R_3$ are hydroxy and $R_4$ is hydrogen, being the compound 2-chloro-3,4-dihydroxyphenyl-2-piperidinylcarbinol.

8. A chemical compound according to claim 1 on which $R_1$ is methyl, $R_2$ and $R_3$ are hydroxy and $R_4$ is hydrogen, being the compound 3,4-dihydroxy-2-methylphenyl-2-piperidinylcarbinol.

References Cited

FOREIGN PATENTS 212,588    4/1956    Australia _____ 260—294.7 R

OTHER REFERENCES

JACS., vol. 52:4006, 4007, 4011 (1930), Crook et al.
Diss. Abstr., vol. 28B, No. 7, pp. 2783–84B, Redalieu (Univ. of Michigan, 1966).

HENRY R. JILES, Primary Examiner

S. D. WINTERS, Assistant Examiner

U.S. Cl. X.R.

424—267; 260—293.73, 600, 297 R, 293.83, 293.54

UNITED STATES PATENT OFFICE
CERTIFICATE OF CORRECTION

PO-1050
(5/69)

Patent No. 3,705,169  Dated December 5, 1972

Inventor(s) Carl Kaiser and Stephen T. Ross

It is certified that error appears in the above-identified patent and that said Letters Patent are hereby corrected as shown below:

Column 2, lines 30 to 35, that portion of the formula reading

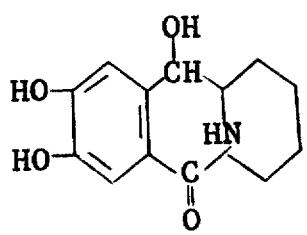 should read 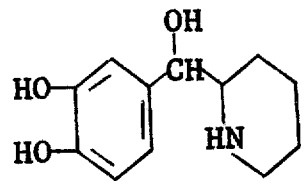

Signed and sealed this 17th day of April 1973.

(SEAL)
Attest:

EDWARD M. FLETCHER, JR.
Attesting Officer

ROBERT GOTTSCHALK
Commissioner of Patents